(12) United States Patent
Nishiya et al.

(10) Patent No.: US 12,521,831 B2
(45) Date of Patent: Jan. 13, 2026

(54) METHOD FOR GRIPPING CONSTANT-VELOCITY UNIVERSAL JOINT COMPONENT

(71) Applicant: NTN Corporation, Osaka (JP)

(72) Inventors: Daigo Nishiya, Shizuoka (JP); Tsukasa Iijima, Shizuoka (JP)

(73) Assignee: NTN CORPORATION, Osaka (JP)

( * ) Notice: Subject to any disclaimer, the term of this patent is extended or adjusted under 35 U.S.C. 154(b) by 779 days.

(21) Appl. No.: 17/782,307

(22) PCT Filed: Nov. 30, 2020

(86) PCT No.: PCT/JP2020/044492
§ 371 (c)(1),
(2) Date: Jun. 3, 2022

(87) PCT Pub. No.: WO2021/112033
PCT Pub. Date: Jun. 10, 2021

(65) Prior Publication Data
US 2023/0045564 A1      Feb. 9, 2023

(30) Foreign Application Priority Data

Dec. 6, 2019   (JP) .................................. 2019-221098

(51) Int. Cl.
*B23Q 17/00*      (2006.01)
*B23B 31/00*      (2006.01)
(Continued)

(52) U.S. Cl.
CPC .......... *B23Q 17/002* (2013.01); *B23B 31/005* (2013.01); *B23B 31/202* (2013.01);
(Continued)

(58) Field of Classification Search
CPC .............. B23Q 17/002; B23Q 17/2409; B23B 31/005; B23B 31/202; B23B 31/208;
(Continued)

(56) References Cited

U.S. PATENT DOCUMENTS 5,595,376 A       1/1997   Hua
2010/0154192 A1   6/2010   Takita et al.
2017/0294374 A1*  10/2017  Simakawa .............. H01L 23/50

FOREIGN PATENT DOCUMENTS

CN    101678552    3/2010
CN    104583716    4/2015
(Continued)

OTHER PUBLICATIONS

International Preliminary Report on Patentability and Written Opinion of the International Searching Authority issued May 17, 2022 in corresponding International (PCT) Patent Application No. PCT/JP2020/044492.

(Continued)

*Primary Examiner* — Sunil K Singh
(74) *Attorney, Agent, or Firm* — Wenderoth, Lind & Ponack, L.L.P.

(57) ABSTRACT

Provided is a gripping method including: a phase matching step of matching tool relief grooves of a contact metal member and track grooves of a constant velocity universal joint component with each other in phase; a measuring step of measuring phase differences between the track grooves of the constant velocity universal joint component and a female spline of the constant velocity universal joint component; a matching step of matching, based on a result of the measuring step, a stopper with a recessed portion of the female spline having the smallest phase difference and gripping the constant velocity universal joint component by a collet chuck. Under a state in which the constant velocity universal (Continued)

joint component is gripped by the collet chuck, the contact metal member holds the constant velocity universal joint component.

6 Claims, 9 Drawing Sheets

(51) Int. Cl.
 *B23B 31/20* (2006.01)
 *B23Q 17/24* (2006.01)
(52) U.S. Cl.
 CPC ........ *B23B 31/208* (2013.01); *B23Q 17/2409* (2013.01); *B23B 2231/2027* (2013.01); *B23B 2231/2075* (2013.01)
(58) Field of Classification Search
 CPC .... B23B 2231/2027; B23B 2231/2075; B23B 2231/46; B23B 2270/48; B23B 31/4033; B23B 31/4013; F16D 3/223; F16D 2003/22309
 See application file for complete search history.

(56) References Cited

FOREIGN PATENT DOCUMENTS

| | | |
|---|---|---|
| JP | 53-63681 | 6/1978 |
| JP | 61-236441 | 10/1986 |
| JP | 62-9841 | 1/1987 |
| JP | 2-85507 | 7/1990 |
| JP | 2-85509 | 7/1990 |
| JP | 7-132403 | 5/1995 |
| JP | 2010-1951 | 1/2010 |
| JP | 2019074152 A * | 5/2019 |

OTHER PUBLICATIONS

International Search Report issued Jan. 19, 2021 in International (PCT) Application No. PCT/JP2020/044492.
Yukiwa Seiko Inc., "Collet Chuck of Pulling Type, Product Catalog", http://www.yukiwa.co.jp.products/sc/, Jun. 15, 2018.
Riken Seiki K.K., "Double-Sided-Split Spline Collet Chuck of Radially Inner Pulling Type, Product Catalog", http://www.rikenseiki.co.jp.types/inner/, Jun. 15, 2018.

* cited by examiner

METHOD FOR GRIPPING CONSTANT-VELOCITY UNIVERSAL JOINT COMPONENT

TECHNICAL FIELD

The present invention relates to a gripping method for a constant velocity universal joint component, and more particularly, to a gripping method for an inner joint member.

BACKGROUND ART

In an inner joint member of a constant velocity universal joint (constant velocity universal joint component), a female spline is formed in a radially inner surface of the inner joint member, and a plurality of track grooves are formed in a radially outer surface of the inner joint member. In this case, an outer diameter and the track grooves of the constant velocity universal joint component are finished by, for example, turning.

Outer diameter processing is performed through use of an outer diameter processing tool, and processing of the track grooves is performed through use of a track processing tool. In this case, the constant velocity universal joint component is gripped by a gripping device. As the gripping device, there can be used a device including a collet 1 as illustrated in FIG. 8 (Non Patent Literature 1). The gripping device illustrated in FIG. 8 includes, for example, the collet 1, a main body member 2, and a shaft member 3. The main body member 2 includes a fitting portion 2a to be fitted into the collet 1. The shaft member 3 is to be fitted into a shaft hole 2b of the main body member 2. A workpiece W being, for example, the constant velocity universal joint component is externally fitted to the collet 1.

As illustrated in FIG. 9, the collet 1 is formed of a short cylindrical body including a radially outer surface 1a formed into a cylindrical surface, and a tapered surface 5 is formed on a radially inner surface 1b of the collet 1. Further, in a peripheral wall 6 of the collet 1, first slits 6a and second slits 6b are formed so as to be alternately arranged in a circumferential direction of the collet 1. The first slits 6a are opened toward one end surface 1c side of the collet 1, and the second slits 6b are opened toward another end surface 1d side of the collet 1. With this configuration, the collet 1 can be increased in diameter.

The shaft member 3 includes a main body portion 3a and an outer collar portion 3b. The main body portion 3a is to be fitted into the shaft hole 2b of the main body member 2. The outer collar portion 3b is formed at a distal end of the main body portion 3a. Accordingly, under a state illustrated in FIG. 8, an end surface 3b1 of the outer collar portion 3b is held in abutment against (contact with) the end surface 1d of the collet 1.

The fitting portion 2a of the main body member 2 has a conical shape reduced in diameter from a proximal end side toward a distal end side of the main body member 2. Accordingly, under the state illustrated in FIG. 8, the tapered surface 5 of the collet 1 is supported on the fitting portion 2a of the main body member 2. Further, the radially outer surface 1a of the collet 1 and a radially inner surface of the workpiece W are held in contact with each other or held close to each other.

Accordingly, when the shaft member 3 is pulled in the direction indicated by the arrow of FIG. 8 from the state illustrated in FIG. 8, the collet 1 is pushed by the outer collar portion 3b in the direction indicated by the arrow of FIG. 8. When the collet 1 is pushed in the direction indicated by the arrow of FIG. 8, the tapered surface 5 of the collet 1 is lifted along a slope of the fitting portion 2a having the conical shape. In this manner, the collet 1 is increased in diameter, and the radially outer surface 1a of the collet 1 and a radially inner surface Wa of the workpiece W are brought into press contact with each other, thereby being capable of gripping the workpiece W. That is, the gripping device illustrated in FIG. 8 forms a collet chuck.

Hitherto, as a gripper for gripping a workpiece by a collet chuck, there has been proposed a collet chuck (double-sided-split spline collet chuck of a radially inner pulling type described in Non Patent Literature 2) that restrains movement of a spindle in a rotation direction thereof during processing (for example, during turning of an outer diameter and track grooves).

Incidentally, when the workpiece W is an inner joint member 20 including a female spline 16 formed in a radially inner surface 15 of an axial hole of the inner joint member 20 and including track grooves 18 formed in a radially outer surface 17 of the inner joint member 20 as illustrated in FIG. 10A and FIG. 10B, under a state in which the inner joint member 20 is gripped on a spindle 25 as illustrated in FIG. 11, the track grooves 18 are processed (by turning or grinding) through use of a track groove processing tool M1, and the radially outer surface 17 is processed (by turning or grinding) through use of a radially outer surface processing tool M2. Ranges to be processed through use of the track groove processing tool M1 are denoted by the reference symbol 18a in FIG. 12, and ranges to be processed through use of the radially outer surface processing tool M2 are denoted by the reference symbol 17a in FIG. 12.

Accordingly, when the workpiece W is the inner joint member 20, as illustrated in FIG. 13 and FIG. 14, it is required that relief portions (relief grooves 10) for preventing contact of the processing tool during processing of the track grooves be formed on the chuck side (gripping device side). That is, a gripping device M illustrated in FIG. 13 and FIG. 14 includes a contact metal member 12 including a projecting portion 11 in which a plurality of tool relief grooves 10 are formed in a center portion of a distal end of the contact metal member 12 along a circumferential direction thereof. From the contact metal member 12, a distal end cone portion 14 of a shaft member 13 protrudes to an outside (to the distal end side) via the projecting portion 11.

Further, a chuck portion 22 of a collet 21 is fitted into the axial hole of the inner joint member 20 being the workpiece W, and the distal end cone portion 14 of the shaft member 13 is fitted into the chuck portion 22. In this case, a radially outer surface 22a and a radially inner surface 22b of the chuck portion 22 are formed into a cylindrical surface and a tapered surface, respectively, and the distal end cone portion 14 of the shaft member 13 is fitted into the chuck portion 22. Further, slits 24 are formed in a peripheral wall 23 of the chuck portion 22.

Accordingly, when the shaft member 13 is advanced relative to the workpiece W in the direction indicated by the arrow, a radially outer surface 14a of the distal end cone portion 14 of the shaft member 13 is slid on the tapered surface 22b being the radially inner surface of the chuck portion 22 of the collet 21 so that the chuck portion 22 is increased in diameter. Further, a radially outer surface of the chuck portion 22 is brought into press contact with the female spline of the radially inner surface of the workpiece W so that the workpiece W can be gripped.

Citation List

Non Patent Literature 1: http://www.yukiwa.co.jp.products/sc/"Collet Chuck of Pulling Type, Product Catalog", "YUKIWA SEIKO INC.", Jun. 15, 2018 Non Patent Literature 2: http://www.rikenseiki.co.jp.types/inner/"Double-Sided-Split Spline Collet Chuck of Radially Inner Pulling Type, Product Catalog", "RIKEN SEIKI K. K.", Jun. 15, 2018

SUMMARY OF INVENTION

Technical Problem

When the inner joint member 20 including the female spline 16 formed in the radially inner surface 15 is chucked (gripped) by the device described in Non Patent Literature 1, a radially outer surface of the collet 21 is brought into press contact with end surfaces of projecting teeth 16a of the female spline 16. Accordingly, portions to be gripped by the collet 21 correspond to ranges "H" illustrated in FIG. 10B. Thus, a total area of the portions to be gripped is small, and hence a gripping force may be insufficient. In this case, when the workpiece W is processed through use of, for example, the radially outer surface processing tool M2 or the track groove processing tool M1, there is a fear in that the workpiece W slips in a rotation direction of the spindle 25 (see FIG. 11).

When the workpiece W slips in the rotation direction of the spindle 25, there may be caused, for example, an unfinished surface remaining on the workpiece W, a collision of the tool with the workpiece W, early breakage (damage) of the tools M1 and M2 due to vibration generated by slippage during processing.

Thus, it is conceivable to increase the gripping force by increasing a force of bringing the radially outer surface 1a of the collet 1 into press contact with the end surfaces of the projecting teeth 16a of the female spline 16. However, when the gripping force is increased, the female spline 16 and the workpiece W may be deformed, and thus product accuracy may be degraded.

Spline phases sometimes vary among the workpieces W (for example, the inner joint member 20 including the female spline 16 formed in the radially inner surface 15, and including the track grooves 18 formed in the radially outer surface 17). It is required to match the chuck side (gripping device side) and the workpiece M side with each other in phase when the workpiece is gripped. In this case, even the gripping device, which employs a double-sided-split spline collet chuck of a radially inner pulling type manufactured by RIKEN SEIKI K. K. (described in Non Patent Literature 2), has not been able to meet this requirement.

Further, as illustrated in FIG. 13 and FIG. 14, when the relief grooves 10 are formed on the gripping device side, it is also required to match the relief grooves 10 on the gripping device side and the grooves (track grooves 18) on the workpiece side with each other in phase. However, the gripping device illustrated in FIG. 13 and FIG. 14 has not been able to achieve such phase matching.

Accordingly, in view of the problems described above, the present invention provides a gripping method for a constant velocity universal joint component, which is capable of effectively preventing a workpiece (constant velocity universal joint component) from slipping off a rotary shaft (spindle) during processing of an outer diameter and track grooves, and effectively preventing a processing tool from colliding with the workpiece during the processing.

Solution to Problem

According to the present invention, there is provided a gripping method for a constant velocity universal joint component using a gripping device for gripping a constant velocity universal joint component, the constant velocity universal joint component comprising: a female spline formed in a radially inner surface of the constant velocity universal joint component; and a plurality of track grooves formed in a radially outer surface of the constant velocity universal joint component, the gripping device comprising: a collet chuck configured to sandwich the constant velocity universal joint component from the radially inner surface; and a contact metal member which comprises tool relief grooves formed therein, and is configured to hold one end surface of the constant velocity universal joint component, the collet chuck comprising a stopper that is to be matched with the tool relief grooves of the contact metal member in phase, the gripping method comprising: a phase matching step of matching the tool relief grooves of the contact metal member and the track grooves of the constant velocity universal joint component with each other in phase; a measuring step of measuring phase differences between the track grooves of the constant velocity universal joint component and the female spline of the constant velocity universal joint component; a matching step of matching, based on a result of the measuring step, the stopper with a recessed portion of the female spline having the smallest phase difference; and a chucking step of gripping the constant velocity universal joint component by the collet chuck after the matching step, wherein under a state in which the constant velocity universal joint component is gripped by the collet chuck, the contact metal member holds the constant velocity universal joint component.

According to the gripping method for a constant velocity universal joint component of the present invention, the collet chuck comprises the stopper. Thus, under a state in which the constant velocity universal joint component is gripped by the collet chuck, the workpiece can be effectively prevented from slipping in the rotation direction of the spindle (rotary shaft). In addition, the phase differences between the track grooves of the constant velocity universal joint component and the female spline of the constant velocity universal joint component are measured, and the stopper is matched with the recessed portion of the female spline based on this measurement. Thus, even when there are wide variations in phase between the track grooves and the female spline, the stopper can be stably matched with the recessed portion of the female spline. Further, the tool relief grooves of the contact metal member and the track grooves of the constant velocity universal joint component can be matched with each other in phase. Accordingly, even when processing of the track grooves is performed on the constant velocity universal joint component under a state in which the constant velocity universal joint component is gripped by the collet chuck, owing to the tool relief grooves, the tool can be effectively prevented from colliding with the constant velocity universal joint component.

The measuring step can be performed through image processing of taking an image of the track grooves of the constant velocity universal joint component and the female spline of the constant velocity universal joint component. The image processing is a method of processing an image obtained from, for example, a camera and extracting desired image information. Through the image processing, the phase differences between the track grooves of the constant velocity universal joint component and the female spline of the constant velocity universal joint component can be stably measured. The image processing is advantageous in that nonlinear processing is achieved easily, that processing and a processing parameter can be changed by a program, and that accuracy is high.

The constant velocity universal joint component can be set so as to be sequentially conveyed to a phase matching zone in which the phase matching step is performed so as to match the tool relief grooves of the contact metal member and the track grooves of the constant velocity universal joint component with each other in phase, a measuring zone in which the measuring step is performed, a matching zone in which the matching step is performed so as to match the stopper based on the result of the measuring step, and a gripping zone in which the constant velocity universal joint component is gripped by the collet chuck. When the constant velocity universal joint component is thus conveyed, excellent workability and excellent productivity are achieved.

The constant velocity universal joint component can be conveyed from the measuring zone to the gripping zone through use of a conveyance pallet comprising at least a pair of claw members configured to position the constant velocity universal joint component by being fitted to the track grooves of the constant velocity universal joint component. When the conveyance pallet described above is used, the tool relief grooves of the contact metal member and the track grooves of the constant velocity universal joint component can be matched with each other in phase. Thus, under a state in which the tool relief grooves of the contact metal member and the track grooves of the constant velocity universal joint component are matched with each other in phase, the constant velocity universal joint component can be conveyed to each zone. In addition, the step in each zone can be performed under this phase matching state so that work (step) in each zone is stably performed.

Advantageous Effects of Invention

According to the gripping method for a constant velocity universal joint component of the present invention, the workpiece can be effectively prevented from slipping in the rotation direction of the spindle (rotary shaft). Thus, for example, an unfinished surface remaining on the constant velocity universal joint component and a collision of the processing tool can be effectively prevented, thereby being capable of providing a high-quality product. In addition, vibration generated during processing can be suppressed, thereby being capable of effectively preventing early breakage of the tool. Further, even when there are wide variations in phase between the track grooves and the female spline, the present invention can deal with the wide variations.

DESCRIPTION OF EMBODIMENTS

Figure 1:
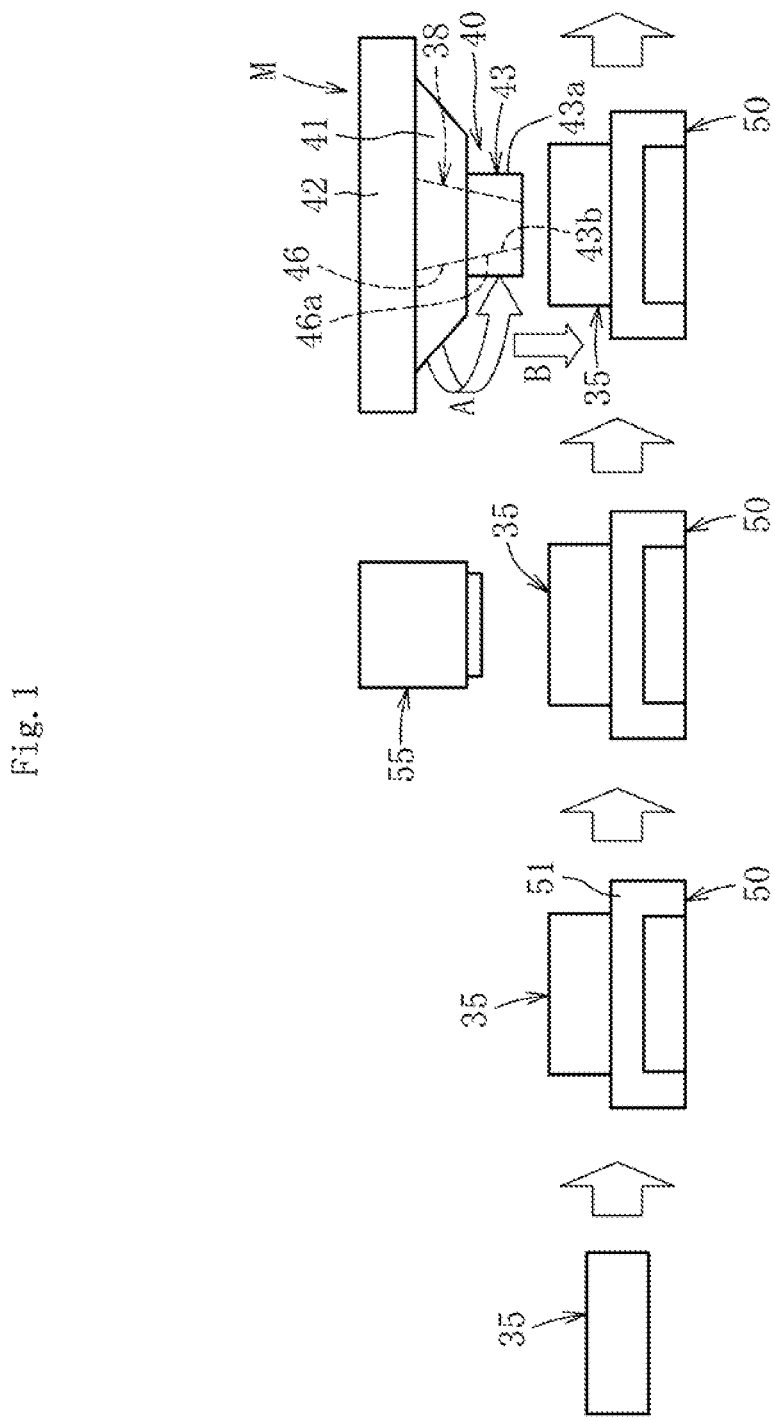
FIG. 1 is a schematic view for illustrating steps of a gripping method for a constant velocity universal joint component according to the present invention.
Figure 4:
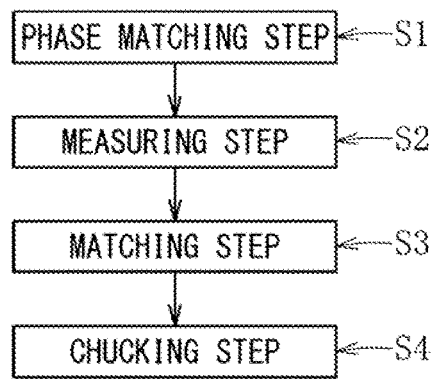
FIG. 4 is a block diagram for illustrating working steps.
Figure 5A:
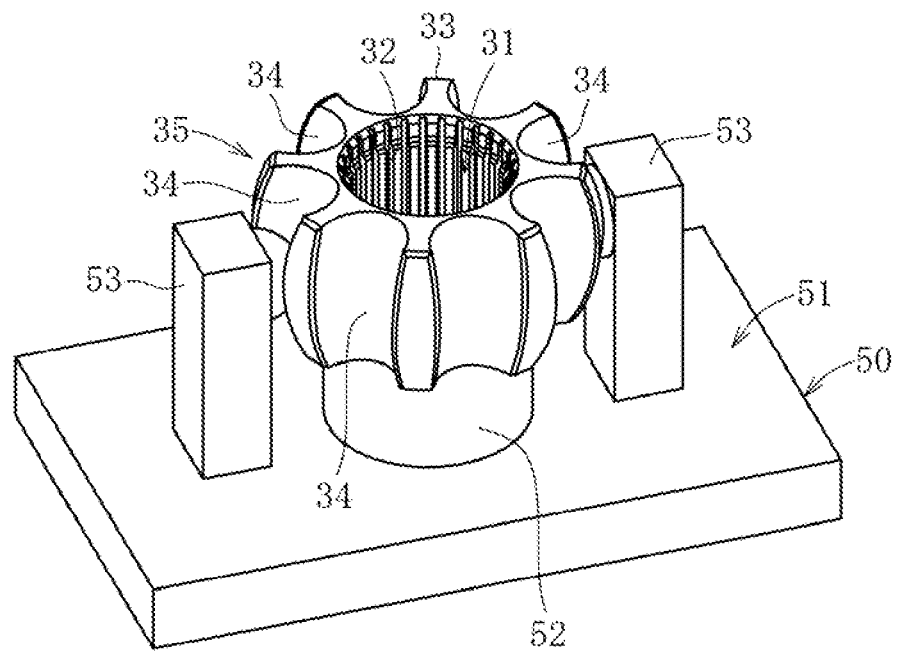
FIG. 5A is a perspective view for illustrating a state in which a constant velocity universal joint component is held on a conveyance table.
Figure 5B:
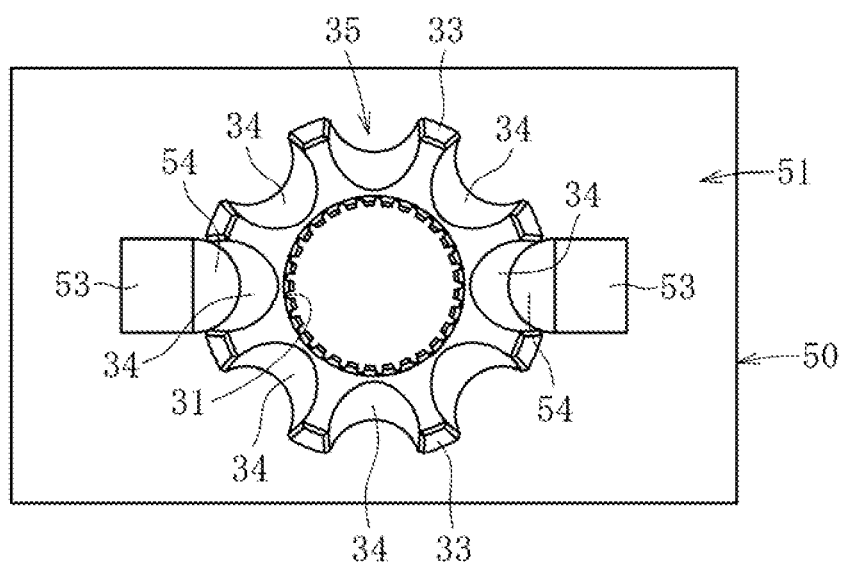
FIG. 5B is a plan view for illustrating a state in which the constant velocity universal joint component is held on the conveyance table.

Now, an embodiment of the present invention is described with reference to FIG. 1 to FIG. 7B. FIG. 1 is a view for illustrating steps of a gripping method for a constant velocity universal joint component according to the present invention. In this case, as illustrated in FIG. 5A and FIG. 5B, the constant velocity universal joint component is an inner joint member (inner ring) 35 comprising a female spline 32 formed in a radially inner surface 31 of the inner joint member 35 and comprising a plurality of track grooves 34 formed in a radially outer surface 33 of the inner joint member 35.

In this gripping method, a gripping device M illustrated in FIG. 1 is used. The gripping device M comprises a collet chuck 40, a contact metal member 41, and a spindle 42. The contact metal member 41 is configured to hold the collet chuck 40. The spindle 42 is configured to support the contact metal member 41. As described later, the spindle 42 is driven to rotate by a driver 57 (see FIG. 3). The driver 57 comprises a motor such as a servomotor, and the driver 57 is controlled by a controller 56 (see FIG. 3). Here, the controller 56 is, for example, a microcomputer in which a read only memory (ROM), a random access memory (RAM), and the like are connected to each other through buses with a central processing unit (CPU) being the center. Further, as a storage, a storage device is connected to this controller 56. The storage device is formed of a hard disc drive (HDD), a digital versatile disk (DVD) drive, a compact disc-recordable (CD-R) drive, an electronically erasable and programmable read only memory (EEPROM), or the like. A program to be executed by the CPU and data are stored in the ROM.

Figure 2:
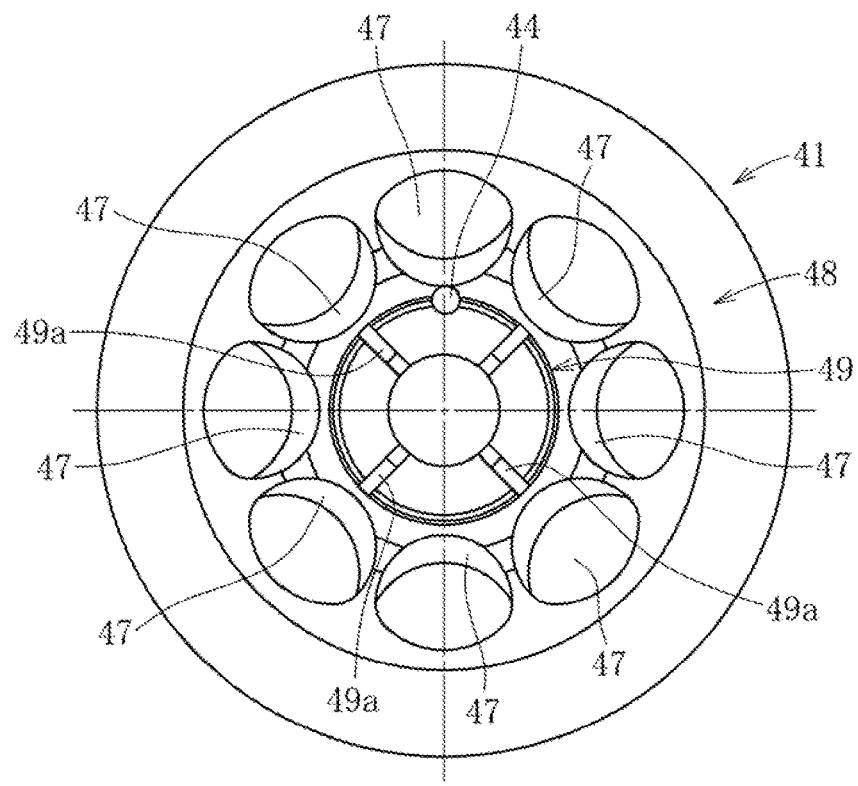
FIG. 2 is an enlarged view for illustrating a main part of a gripping device to be used in the gripping method for a constant velocity universal joint component according to the present invention.
Figure 3:
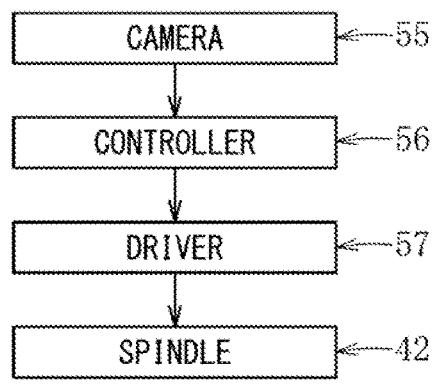
FIG. 3 is a schematic configuration diagram for illustrating an image processing device.
Figure 11:
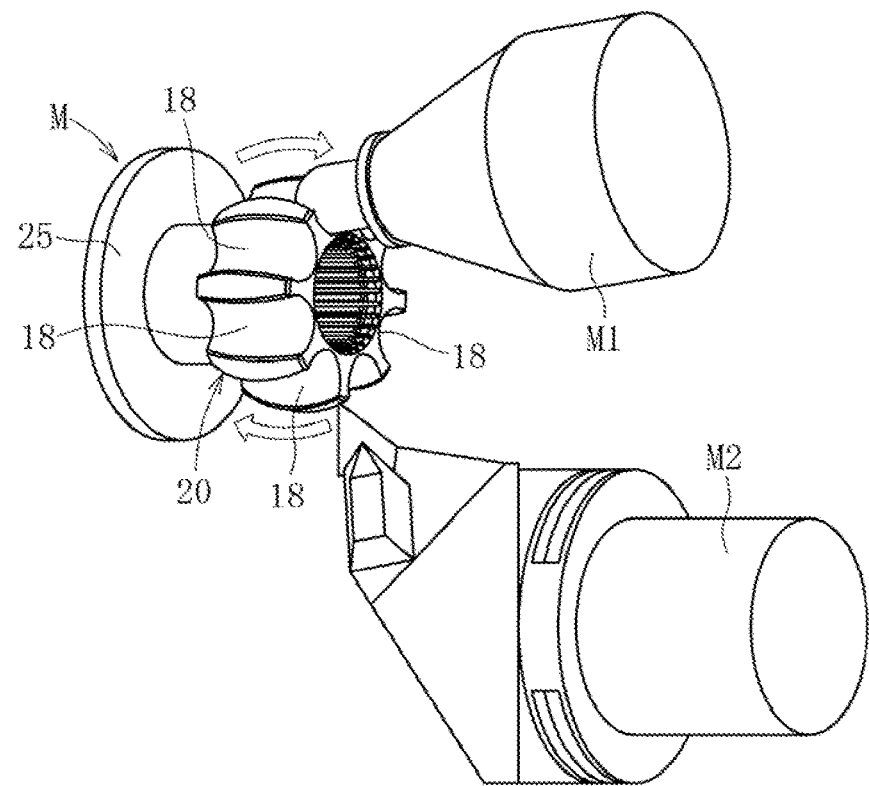
FIG. 11 is a perspective view for illustrating a state in which the track grooves and a radially outer surface are finished.
Figure 12:
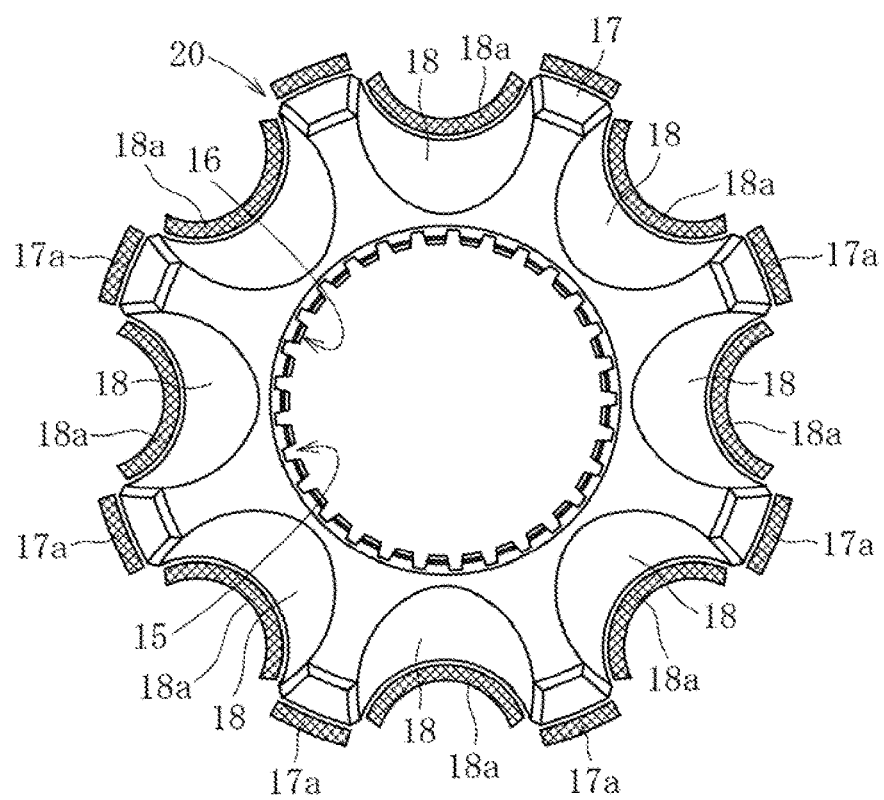
FIG. 12 is a schematic view for illustrating regions processed through use of a track groove processing tool and a radially outer surface processing tool.
Figure 13:
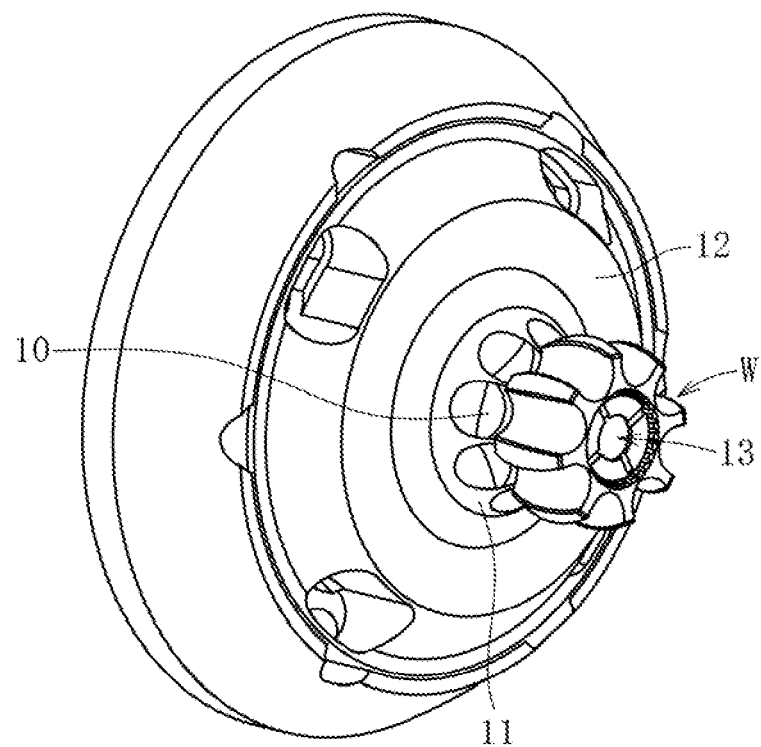
FIG. 13 is a perspective view for illustrating a state of the constant velocity universal joint component gripped by the gripping device to be used in a related-art gripping method for a constant velocity universal joint component.
Figure 14:
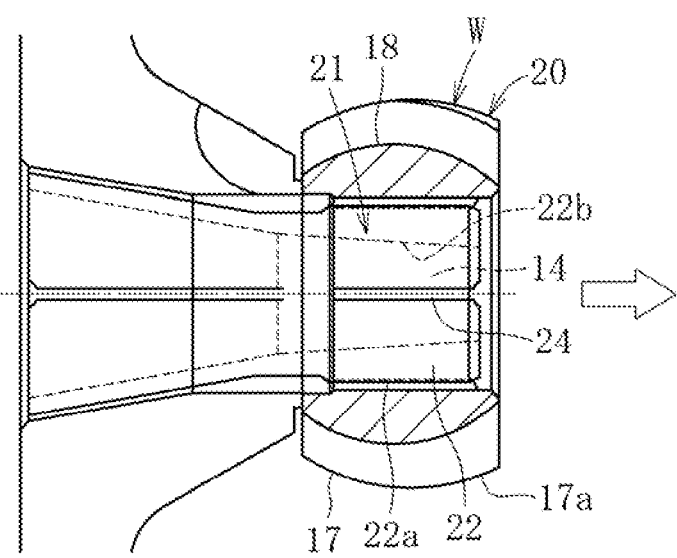
FIG. 14 is a sectional view for illustrating a main part of the gripping device illustrated in FIG. 11.

Similarly to the device illustrated in FIG. 11 and FIG. 12, the collet chuck 40 comprises a chuck portion 43. The chuck portion 43 comprises a radially outer surface 43a and a radially inner surface 43b formed into a cylindrical surface and a tapered surface, respectively. The tapered surface being the radially inner surface 43b is reduced in diameter toward a distal end (lower end) of the chuck portion 43. A stopper 44 as illustrated in FIG. 2 is formed on the chuck portion 43 of the collet chuck 40. In this case, as illustrated in FIG. 7B, the stopper 44 can be formed of a rod-shaped body to be fitted into one of recessed portions 32b of the female spline 32.

Further, similarly to the device illustrated in FIG. 11 and FIG. 12, as illustrated in FIG. 2, the contact metal member 41 comprises a projecting portion 48. The projecting portion 48 comprises a plurality of tool relief grooves 47 formed in a center portion of a distal end of the contact metal member 41 along a circumferential direction thereof. From the contact metal member 41, a distal end cone portion 46 of a shaft member 36 protrudes to the outside (to the distal end side) via the projecting portion 48. The distal end cone portion 46 of the shaft member 36 is fitted into the chuck portion 43. In this case, a radially outer surface 46a of the distal end cone portion 46 is also formed into a tapered surface reduced in diameter toward a distal end (lower end) of the shaft member 36. Further, a plurality of (three in the illustrated example) slits 49a are formed in a peripheral wall 49 of the distal end cone portion 46.

Accordingly, when the shaft member 36 is advanced relative to the inner joint member 35 being a workpiece in the direction indicated by the arrow, the radially outer surface 46a (see FIG. 1) of the distal end cone portion 46 of the shaft member 36 is slid on the tapered surface being the radially inner surface 43b (see FIG. 1) of the chuck portion 43 of the collet chuck 40 so that the chuck portion 43 is increased in diameter. Further, the radially outer surface 43a of the chuck portion 43 is brought into press contact with the female spline 32 of the radially inner surface 31 of the inner joint member 35 so that the inner joint member 35 can be gripped. At this time, when the stopper 44 is brought into a state of being fitted to one of the recessed portions 32b of the female spline 32, during rotation of the spindle 42, slippage of the inner joint member 35 in the rotation direction can be effectively prevented.

Incidentally, as illustrated in FIG. 1, in the gripping method for a constant velocity universal joint component, under a state in which the constant velocity universal joint component (inner joint member 35) being a workpiece is placed and held on a conveyance pallet 50, the constant velocity universal joint component is sequentially conveyed to each step. As illustrated in FIG. 4, the steps of the gripping method comprises: a phase matching step S1 of placing the inner joint member 35 on the conveyance pallet 50 so as to match the tool relief grooves 47 of the contact metal member 41 and the track grooves 34 of the constant velocity universal joint component 35 with each other in phase; a measuring step S2 of performing image processing; a matching step S3 of matching, based on the result of the measuring step S2, the stopper with the recessed portion 32b of the female spline 32 having the smallest phase difference; and a chucking step S4 of gripping the constant velocity universal joint component 35 by the collet chuck 40 after the matching step S3.

As illustrated in FIG. 5A and FIG. 5B, the conveyance pallet 50 comprises a base 51, a seat body 52, support columns 53 and 53, and claw members 54 and 54. The seat body 52 is arranged on the base 51. The support columns 53 and 53 are arranged so as to be 180 degrees opposite to each other across the seat body 52. The claw members 54 and 54 are provided on the support columns 53 and 53, respectively.

The seat body 52 is formed of, for example, a short cylindrical body or short columnar body comprising a flat upper surface. Further, the claw members 54 and 54 protrude from upper portions of the support columns 53 and 53 to the workpiece (constant velocity universal joint:inner joint member 35) side so as to be opposed to each other, and each have such a shape as to be fitted to the track groove 34. With this configuration, when the inner joint member 35 is placed on the seat body 52, the pair of claw members 54 and 54 can be fitted to the corresponding track grooves 34 and 34, respectively. Accordingly, under a state in which the inner joint member 35 is positioned, the inner joint member 35 is placed and fixed on the conveyance pallet 50, and thus the tool relief grooves 47 of the contact metal member 41 and the track grooves 34 of the constant velocity universal joint component 35 can be matched with each other in phase.

Further, in a measuring zone in which the measuring step S2 is performed so as to perform image processing, there is provided a camera 55 configured to take an image of the track grooves 34 and the female spline 32 of the inner joint member 35 that is arranged (placed) on the conveyance pallet 50. The camera 55 can be formed of, for example, a camera with CCD or a camera with CMOS. Image data obtained by the camera 55 (data relating to the track grooves 34 and the female spline 32 of the inner joint member 35) is sent to the controller 56, and a position of the stopper 44 of the collet in the circumferential direction is determined based on this data.

In a zone in which the matching step is performed, the spindle 42 comprising the contact metal member 41 is arranged. In this case, the collet chuck 40 is provided on the contact metal member 41, and is arranged at a position above the inner joint member 35 on the conveyance pallet 50 so as to be opposed to the inner joint member 35. Further, the matching step S3 and the chucking step S4 of gripping the inner joint member 35 are performed in the same zone.

Next, with reference to, for example, FIG. 1 and FIG. 4, description is made of a gripping method for the inner joint member 35 using the gripping device configured as described above. First, the tool relief grooves 47 and the stopper 44 are matched with each other in phase. That is, the position of the stopper 44 in the circumferential direction is matched with a position of one of the tool relief grooves 47 in the circumferential direction.

Then, in a placing zone in which the phase matching step S1 is performed, as illustrated in FIG. 5A and FIG. 5B, the inner joint member 35 in a positioned state is placed and fixed on the conveyance pallet 50. Then, the conveyance pallet 50 is conveyed to the measuring zone. As a conveying unit configured to convey the conveyance pallet 50, there may be used a variety of publicly-known and available conveying units such as a conveyor, a conveying robot, and a self-propelled carriage.

An image of the inner joint member 35 that has been conveyed to the measuring zone is taken by the camera. Then, based on the image, displacement between the track grooves 34 and the female spline 32 is detected. At this time, displacement of the recessed portions 32b of the female spline 32 with respect to all the track grooves 34 is detected so as to detect the recessed portion 32b of the female spline 32 having the smallest displacement amount with respect to a position of the track groove 34. This recessed portion 32b and the track groove 34 corresponding to this recessed portion 32b are detected. The reference symbol "G" in FIG.

Figure 6A:
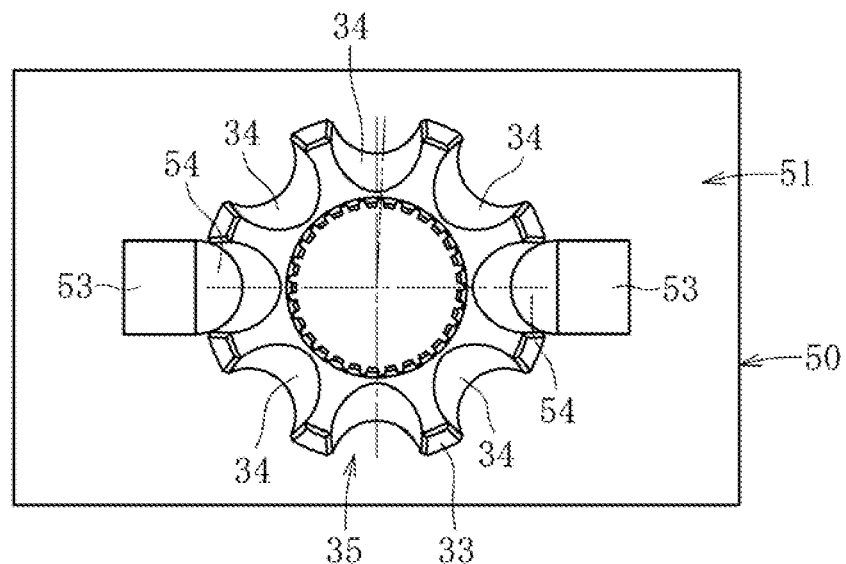
FIG. 6A is a plan view of the constant velocity universal joint component, for illustrating a relationship between track grooves and a female spline of the constant velocity universal joint component.
Figure 6B:
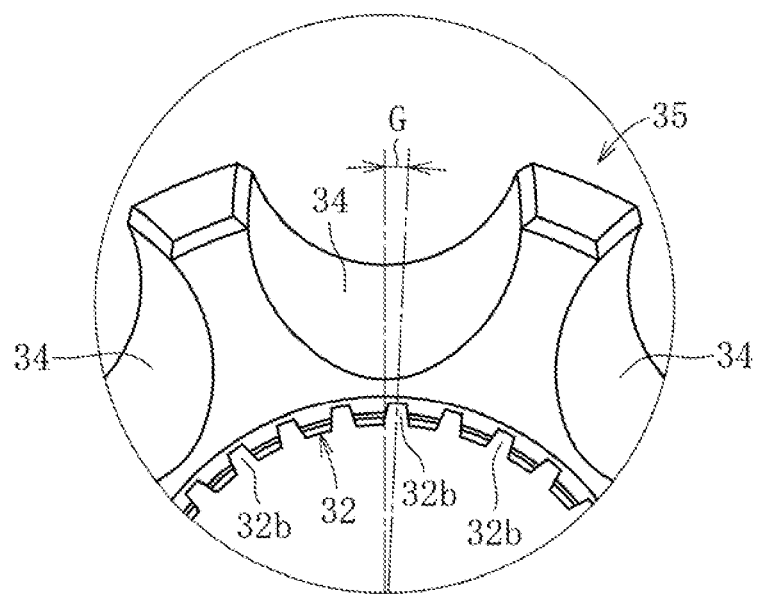
FIG. 6B is an enlarged view for illustrating a main part of FIG. 6A.

6A and FIG. 6B indicates the displacement amount between the track groove 34 and the female spline 32.

After that, the conveyance pallet 50 is conveyed to a gripping zone. Then, the position of the stopper 44 in the circumferential direction is matched with the position of the recessed portion 32b of the female spline 32 in the circumferential direction that is determined in the measuring zone. In this case, matching is performed in such a manner that the spindle 42 is rotated (turned) about its axis in, for example, the direction indicated by the arrow "A" of FIG. 1 through driving of the driver 57 controlled by the controller 56. Under this state, the spindle 42 is lowered in the direction indicated by the arrow "B" of FIG. 1, and the chuck portion 43 of the collet chuck 40 is fitted into a center hole of the inner joint member 35. Under this state, the shaft member 36 is advanced so as to increase the chuck portion 43 in diameter.

Figure 7A:
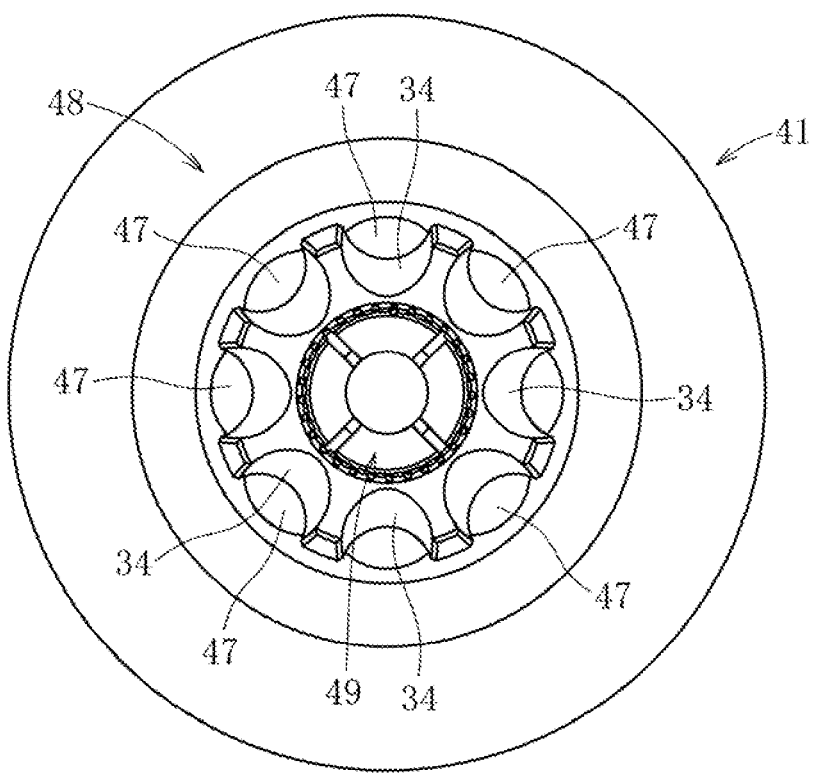
FIG. 7A is a bottom view for illustrating a gripped state of the constant velocity universal joint component.
Figure 7B:
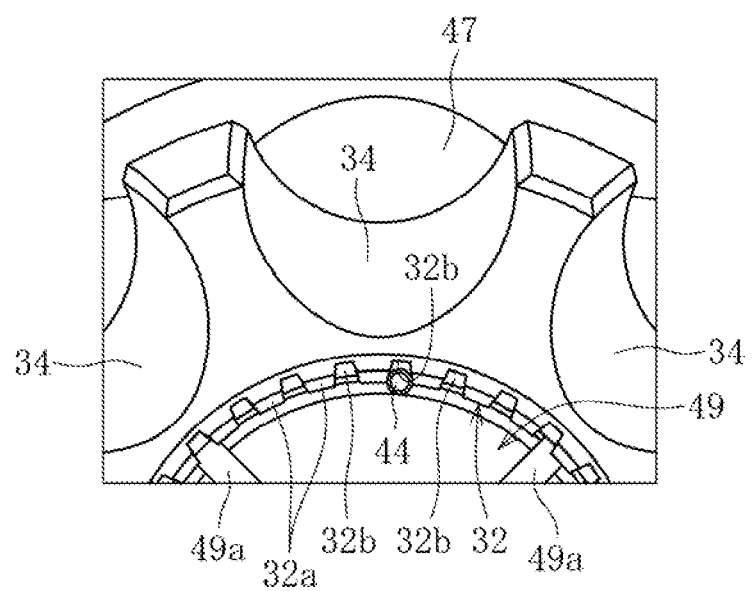
FIG. 7B is an enlarged view for illustrating a main part of FIG. 7A.
Figure 8:
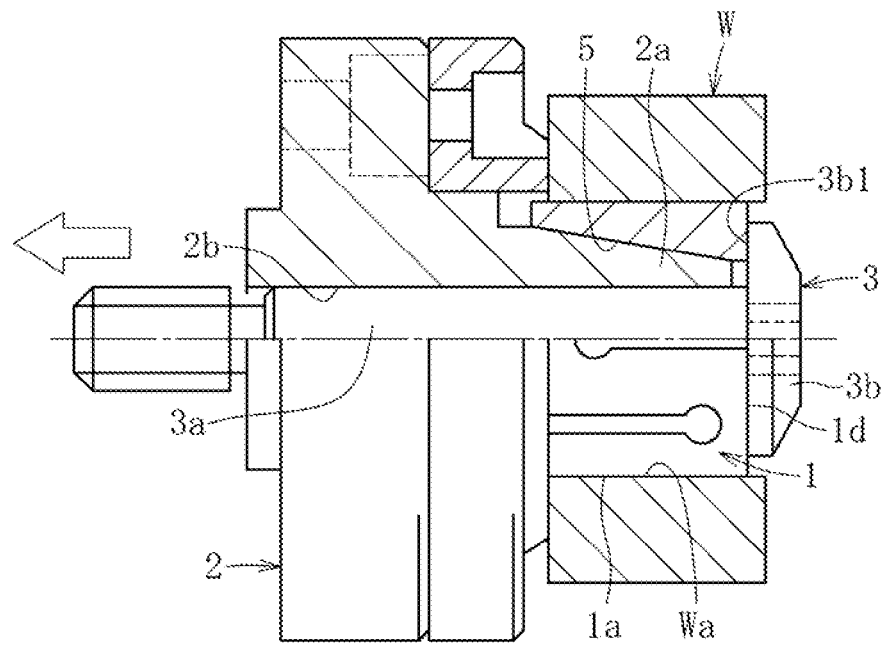
FIG. 8 is a side view for illustrating a related-art gripping device, partially in cross section.
Figure 9:
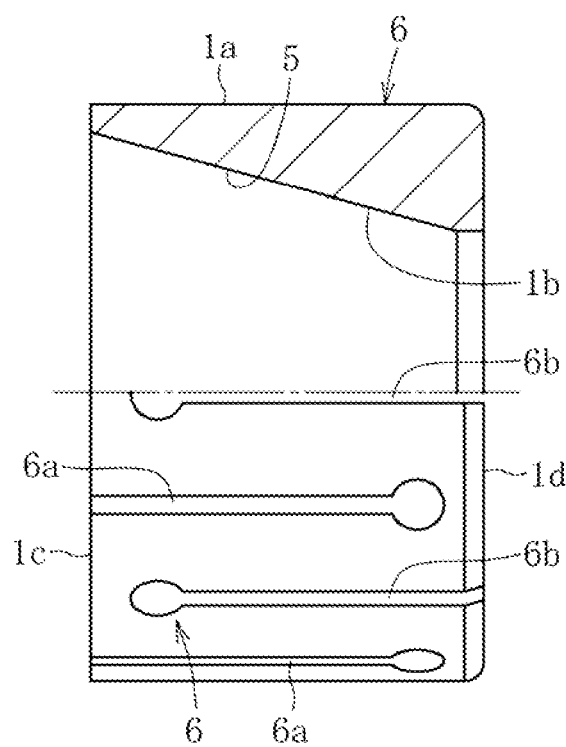
FIG. 9 is a half sectional view for illustrating a collet of the gripping device illustrated in FIG. 8.
Figure 10A:
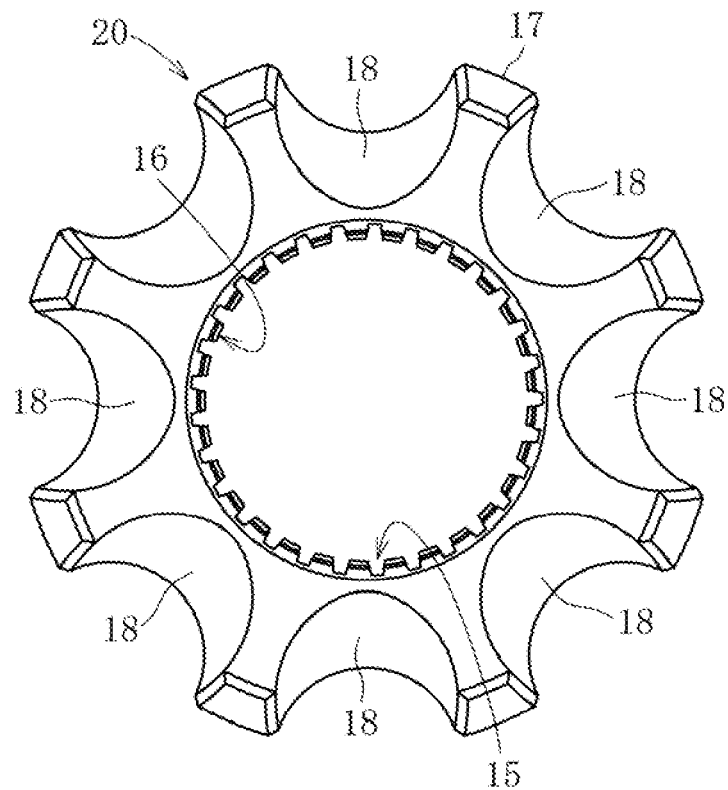
FIG. 10A is a plan view for illustrating an inner joint member being the constant velocity universal joint component.
Figure 10B:
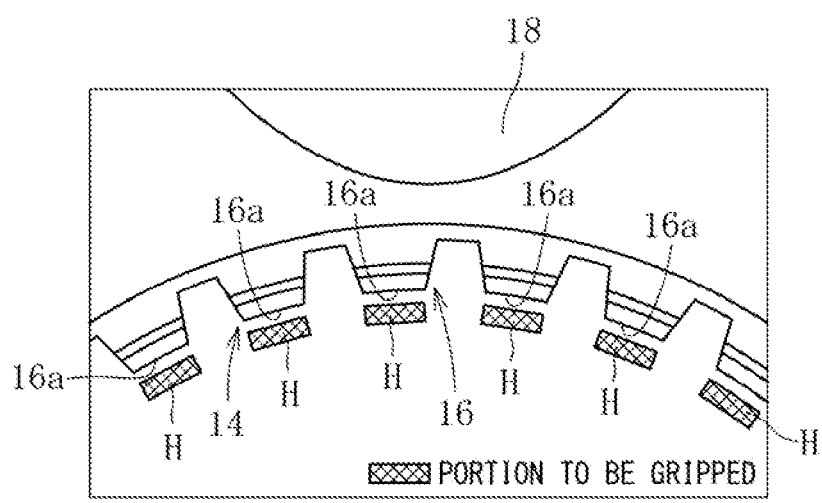
FIG. 10B is an enlarged view for illustrating a main part of FIG. 10A.

In this manner, as illustrated in FIG. 7A and FIG. 7B, the stopper 44 is fitted to the recessed portion 32b of the female spline 32, and the radially outer surface 43a of the chuck portion 43 is brought into press contact with end surfaces of protruding portions 32a of the female spline 32. Consequently, the inner joint member 35 is gripped on the spindle 42 through intermediation of the collet chuck 40. At this time, the tool relief grooves 47 of the contact metal member 41 and the track grooves 34 of the constant velocity universal joint component 35 are matched with each other in phase.

The inner joint member 35 in a state of being gripped on the spindle 42 is moved to a processing room. As illustrated in FIG. 11, under a state in which the constant velocity universal joint component 35 is gripped by the collet chuck 40 in the processing room, processing of the radially outer surface 33 and processing of the track grooves 34 can be performed on the constant velocity universal joint component 35.

According to the gripping method for a constant velocity universal joint component of the present invention, the collet chuck 40 comprises the stopper 44. Accordingly, under a state in which the constant velocity universal joint component is gripped by the collet chuck 40, the constant velocity universal joint component (inner joint member 35) being the workpiece can be effectively prevented from slipping in the rotation direction of the spindle (rotary shaft) 25. Further, the tool relief grooves 47 of the contact metal member 41 and the track grooves 34 of the constant velocity universal joint component 35 can be matched with each other in phase. Thus, even when processing of the track grooves 34 is performed on the constant velocity universal joint component 35 under a state in which the constant velocity universal joint component 35 is gripped by the collet chuck 40, owing to the tool relief grooves 47, the tool can be effectively prevented from colliding with the constant velocity universal joint component 35.

Thus, in the present invention, for example, an unfinished surface remaining on the constant velocity universal joint component 35 and a collision of the processing tool can be effectively prevented, thereby being capable of providing a high-quality product. In addition, vibration generated during processing can be suppressed, and hence early breakage of the tool can be effectively prevented. Further, the phase differences between the track grooves 34 of the constant velocity universal joint component 35 and the female spline 32 of the constant velocity universal joint component 35 are measured, and the stopper is matched with the recessed portion 32b of the female spline 32 based on this measurement. Even when there are wide variations in phase between the track grooves 34 and the female spline 32, the stopper 44 can be stably matched with the recessed portion 32b of the female spline 32.

The measuring step S2 can be performed through image processing of taking an image of the track grooves 34 of the constant velocity universal joint component 35 and the female spline 32 of the constant velocity universal joint component 35. The image processing is a method of processing an image obtained from, for example, a camera and extracting desired image information. Through the image processing, the phase differences between the track grooves of the constant velocity universal joint component 35 and the female spline of the constant velocity universal joint component 35 can be stably measured. The image processing is advantageous in that nonlinear processing is achieved easily, that processing and a processing parameter can be changed by a program, that accuracy is high, and the like.

The constant velocity universal joint component 35 can be sequentially conveyed to a phase matching zone in which the phase matching step S1 is performed so as to match the tool relief grooves 47 of the contact metal member 41 and the track grooves 34 of the constant velocity universal joint component 35 with each other in phase, the measuring zone in which the measuring step S2 is performed, a matching zone in which the matching step is performed so as to match the stopper based on the result of the measuring step S2, and a gripping zone in which the constant velocity universal joint component 35 is gripped by the collet chuck 40. When the constant velocity universal joint component 35 is thus conveyed, improvement of productivity can be achieved.

The constant velocity universal joint component 35 can be conveyed from the measuring zone to the gripping zone through use of the conveyance pallet 50 comprising at least a pair of claw members 54 and 54 configured to position the constant velocity universal joint component 35 by being fitted to the track grooves 34 of the constant velocity universal joint component 35. When the conveyance pallet 50 described above is used, the constant velocity universal joint component 35 in a positioned state can be conveyed, and phase matching can be stably performed in each step.

The embodiment of the present invention is described above, but the present invention is not limited to the above-mentioned embodiment. Various modifications may be made thereto. The inner joint member 35 in the embodiment comprises eight track grooves 34, but the number of the track grooves 34 is not limited to eight. The number of the track grooves 34 may be, for example, six or ten. Further, a pair of claw members 54 is provided in the embodiment, but the present invention is not limited to the claw members 54 provided in pair. Three or more claw members 54 may be provided.

INDUSTRIAL APPLICABILITY

The constant velocity universal joint component may be an inner joint member of a fixed type constant velocity universal joint such as a Barfield type, or an inner joint member of another fixed type constant velocity universal joint such as an undercut-free type. Further, the constant velocity universal joint component may be, for example, an inner joint member of a plunging type constant velocity universal joint such as a cross-groove type, and a tripod member being an inner joint member of another plunging type constant velocity universal joint such as a tripod type.

REFERENCE SIGNS LIST 31 radially inner surface
32 female spline 33 radially outer surface
34 track groove
35 constant velocity universal joint component (inner joint member)
40 collet chuck
41 contact metal member
44 stopper
47 tool relief groove
50 conveyance pallet
54 claw member
S1 phase matching step
S2 measuring step
S3 matching step
S4 chucking step

The invention claimed is:

1. A gripping method for a constant velocity universal joint component using a gripping device for gripping the constant velocity universal joint component,
the constant velocity universal joint component comprising:
a female spline formed in a radially inner surface of the constant velocity universal joint component; and
a plurality of track grooves formed in a radially outer surface of the constant velocity universal joint component,
the gripping device comprising:
a collet chuck configured to sandwich the constant velocity universal joint component from the radially inner surface; and
a contact metal member which comprises tool relief grooves formed therein, and is configured to hold one end surface of the constant velocity universal joint component,
wherein the collet chuck comprises a stopper that is to be phase matched with the tool relief grooves of the contact metal member,
the gripping method comprising:
a phase matching step of phase matching the tool relief grooves of the contact metal member and the track grooves of the constant velocity universal joint component with each other;
a measuring step of measuring phase differences between the track grooves of the constant velocity universal joint component and the female spline of the constant velocity universal joint component;
a matching step of matching, based on a result of the measuring step, the stopper with a recessed portion of the female spline having a smallest phase difference; and
a chucking step of gripping the constant velocity universal joint component by the collet chuck after the matching step,
wherein under a state in which the constant velocity universal joint component is gripped by the collet chuck, the contact metal member holds the constant velocity universal joint component.

2. The gripping method for a constant velocity universal joint component according to claim 1, wherein the measuring step is performed through image processing of taking an image of the track grooves of the constant velocity universal joint component and the female spline of the constant velocity universal joint component.

3. The gripping method for a constant velocity universal joint component according to claim 1, wherein the constant velocity universal joint component is sequentially conveyed to a phase matching zone in which the phase matching step is performed so as to phase match the tool relief grooves of the contact metal member and the track grooves of the constant velocity universal joint component with each other, a measuring zone in which the measuring step is performed, a matching zone in which the matching step is performed so as to match the stopper based on the result of the measuring step, and a gripping zone in which the constant velocity universal joint component is gripped by the collet chuck.

4. The gripping method for a constant velocity universal joint component according to claim 3, wherein the constant velocity universal joint component is conveyed from the measuring zone to the gripping zone through use of a conveyance pallet comprising at least a pair of claw members configured to position the constant velocity universal joint component by being fitted to the track grooves of the constant velocity universal joint component.

5. The gripping method for a constant velocity universal joint component according to claim 2, wherein the constant velocity universal joint component is sequentially conveyed to a phase matching zone in which the phase matching step is performed so as to phase match the tool relief grooves of the contact metal member and the track grooves of the constant velocity universal joint component with each other, a measuring zone in which the measuring step is performed, a matching zone in which the matching step is performed so as to match the stopper based on the result of the measuring step, and a gripping zone in which the constant velocity universal joint component is gripped by the collet chuck.

6. The gripping method for a constant velocity universal joint component according to claim 5, wherein the constant velocity universal joint component is conveyed from the measuring zone to the gripping zone through use of a conveyance pallet comprising at least a pair of claw members configured to position the constant velocity universal joint component by being fitted to the track grooves of the constant velocity universal joint component.

* * * * *